United States Patent
Aramaki et al.

(10) Patent No.: US 7,099,694 B1
(45) Date of Patent: Aug. 29, 2006

(54) BASE STATION APPARATUS AND NETWORK IDENTIFIER ASSIGNMENT METHOD

(75) Inventors: Takashi Aramaki, Yokohama (JP); Yoshimasa Shirasaki, Fujisawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 449 days.

(21) Appl. No.: 09/762,581

(22) PCT Filed: Jun. 8, 2000

(86) PCT No.: PCT/JP00/03704

§ 371 (c)(1),
(2), (4) Date: Apr. 2, 2001

(87) PCT Pub. No.: WO00/77981

PCT Pub. Date: Dec. 21, 2000

(30) Foreign Application Priority Data

Jun. 10, 1999 (JP) .................................. 11/164468

(51) Int. Cl.
*H04B 1/38* (2006.01)
*H04M 1/00* (2006.01)

(52) U.S. Cl. ...................... 455/561; 455/446; 455/449; 370/313; 370/338; 709/222

(58) Field of Classification Search ................. 455/88, 455/420, 450–452.1, 434, 435.1, 500, 507, 455/561, 446, 449; 370/313, 329, 338, 349; 709/208, 222, 223, 237
See application file for complete search history.

(56) References Cited

U.S. PATENT DOCUMENTS 5,054,110 A * 10/1991 Comroe et al. .......... 455/435.1
5,150,464 A * 9/1992 Sidhu et al. ................ 709/222
5,408,618 A * 4/1995 Aho et al. .................. 710/104
5,655,219 A 8/1997 Jusa et al.
5,852,405 A 12/1998 Yoneda et al.
5,854,785 A 12/1998 Willey
5,960,344 A * 9/1999 Mahany .................... 455/432.2
6,157,818 A * 12/2000 Rode ............................. 455/88
6,483,852 B1 * 11/2002 Jacquet et al. .............. 370/466
6,546,001 B1 * 4/2003 Semper et al. .............. 370/349
6,597,671 B1 * 7/2003 Ahmadi et al. ............. 370/329

FOREIGN PATENT DOCUMENTS

| DE | 19740713 | | 4/1999 |
|---|---|---|---|
| JP | 491522 | | 3/1992 |
| JP | 8107414 | | 4/1996 |
| JP | 08107414 A | * | 4/1996 |
| WO | 9922541 | | 5/1999 |

OTHER PUBLICATIONS

Vijay K. Garg, et al.; "Applications of CDMA in Wireless/Personal Communications", Prentice Hall PTR, pp. 80-83, 1997.
Australian Office Action dated Oct. 16, 2001.
Supplementary European Search Report dated Apr. 27, 2005.
Hagstrom, et al., "RBS 884 A New Generation Radio Base Stations for the American Standard," Ericsson Review, Ericsson, Stockholm, SE, XP000429339, pp. 4-13, Jan. 1994.

* cited by examiner

*Primary Examiner*—Steve M. D'Agosta
(74) *Attorney, Agent, or Firm*—Stevens, Davis, Miller & Mosher, LLP

(57) ABSTRACT

When a communication network is newly set up, the NET-ID assignment method investigates NET-IDs of adjacent base stations and then decides an appropriate NET-ID based on the investigation result. At this time, the decided NET-ID is updated in a NET-ID table stored in the base station.

1 Claim, 8 Drawing Sheets

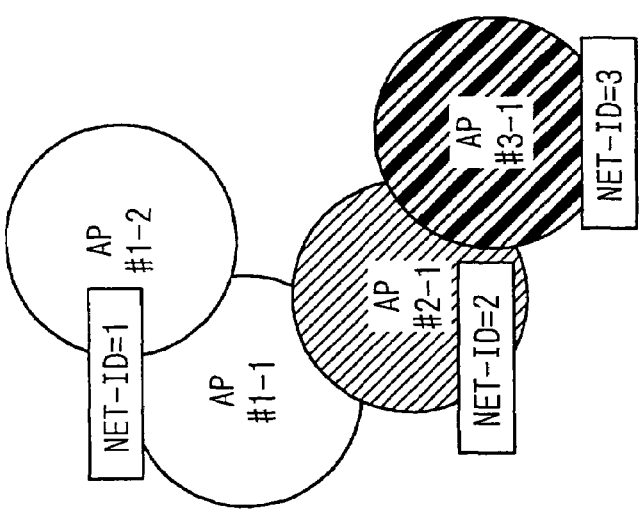

FIG. 5

AP#1-1 NET-ID TABLE

| BEFORE CHANGE | | AFTER CHANGE | |
|---|---|---|---|
| NET-ID | STATUS OF USE | NET-ID | STATUS OF USE |
| 0 | UNUSED | 0 | UNUSED |
| 1 | USED | 1 | USED |
| 2 | USED | 2 | USED |
| 3 | UNUSED | 3 | USED |

AP#3-1 NET-ID TABLE

| BEFORE CHANGE | | AFTER CHANGE | |
|---|---|---|---|
| NET-ID | STATUS OF USE | NET-ID | STATUS OF USE |
| 0 | UNUSED | 0 | UNUSED |
| 1 | UNUSED | 1 | USED |
| 2 | UNUSED | 2 | USED |
| 3 | UNUSED | 3 | USED |

AP#2-1 NET-ID TABLE

| BEFORE CHANGE | | AFTER CHANGE | |
|---|---|---|---|
| NET-ID | STATUS OF USE | NET-ID | STATUS OF USE |
| 0 | UNUSED | 0 | UNUSED |
| 1 | USED | 1 | USED |
| 2 | USED | 2 | USED |
| 3 | UNUSED | 3 | USED |

BASE STATION APPARATUS AND NETWORK IDENTIFIER ASSIGNMENT METHOD

TECHNICAL FIELD

The present invention relates to a base station apparatus and network identifier assignment method used in a digital radio communication system.

BACKGROUND ART

Identification of a communication network is made in a digital radio communication system including a plurality of base station apparatuses that perform radio communications with at least one communication terminal apparatus. This communication network identification is made, for example, in the following cases:

(1) To check whether a network is connectable or not prior to authentication, etc. after power of a communication terminal is turned on and before starting a communication with a base station (AP) (at the time of so-called association)

(2) To verify operator and services supported, etc. at handover destination

Identification of a communication network is made using a network identifier (e.g., network ID, hereinafter abbreviated as "NET-ID"). For this NET-ID, several bits of CCH (Broadcast Control CHannel) are used. A communication network is made identifiable by assigning this NET-ID to each communication network.

In general, 4 bits of BCCH are used as a NET-ID, making 16 types of communication network identifiable. This NET-ID is determined using random numbers when a communication network is set up.

However, in Japan, 4 frequencies are assigned as a 5-GHz band of radio communication. When there are many adjacent private networks in office buildings in a downtown area or when there is a plurality of public networks of different service types, etc., there can be many communication networks in narrow bands of a specific region.

Considering these situations, it is quite difficult to identify a communication network using a 4-bit NET-ID. Therefore, when many communication networks coexist, it may be quite difficult to identify communication networks according to the conventional method.

DISCLOSURE OF INVENTION

It is an object of the present invention to provide a base station apparatus and network identifier assignment method capable of making identification of communication networks even when many communication networks coexist.

A theme of the present invention is to investigate NET-IDs of adjacent base stations, assign a NET-ID of the own station based on the investigation result and prevent NET-IDs from colliding with each other even when many communication networks coexist.

BRIEF DESCRIPTION OF DRAWINGS

FIG. 5 is a drawing to explain a method of assigning NET-IDs to a communication network;

BEST MODE FOR CARRYING OUT THE INVENTION

With reference now to the attached drawings, embodiments of the present invention will be explained in detail below.

EMBODIMENT 1

Figure 1:
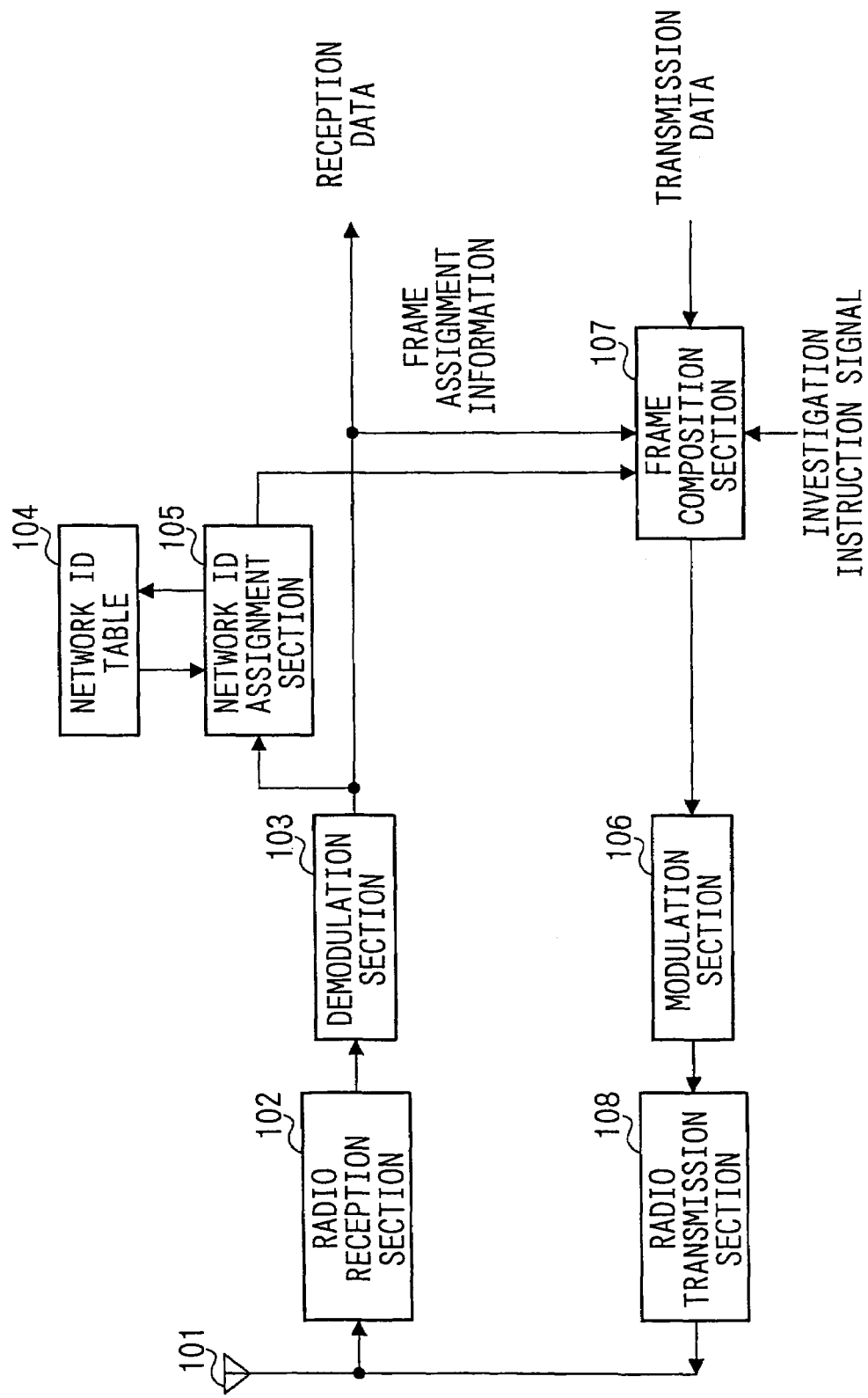
FIG. 1 is a block diagram showing an outlined configuration of a base station apparatus according to Embodiment 1 of the present invention.

FIG. 1 is a block diagram showing a configuration of a base station apparatus according to Embodiment 1 of the present invention. Here, a base station apparatus in a TDMA-based digital radio communication system will be explained. Furthermore, suppose the network identifier is a 2-bit network ID. Also suppose communication networks include in-house LANs and various radio communication systems, etc.

A signal sent from the other end of communication is received by radio reception section 102 via antenna 101. Radio reception section 102 performs processing such as amplification (gain control), down-conversion, A/D conversion, etc. on the reception signal. After A/D conversion, this signal is sent to demodulation section 103 and demodulated there, and output as reception data.

The demodulated signal is sent to network ID assignment section 105. Network ID assignment section 105 assigns a NET-ID of the own station based on a NET ID of another base station included in the signal and updates network ID table 104. The content of this updated network ID table 104 is sent out, and therefore this content is sent to frame composition section 107.

The transmission data is sent to frame composition section 107, frame-composed there and sent to modulation section 106. Furthermore, after being modulated by modulation section 106, the transmission data is sent to radio transmission section 108. Radio transmission section 108 performs processing such as D/A conversion, up-conversion, amplification (gain control) on the modulated signal. The signal processed in this way is sent via antenna 101 as a transmission signal.

Figure 2:
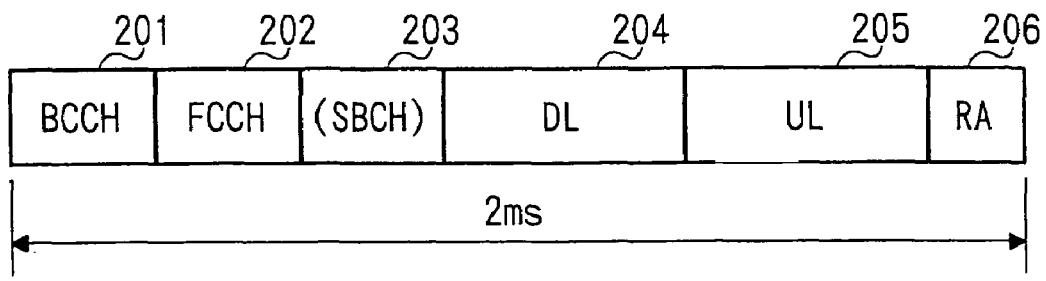
FIG. 2 illustrates a frame format used in a radio communication.

Then, operation of the base station apparatus with such a configuration, that is, the method of assigning NET-ID will be explained. Here, suppose a TDMA communication is performed with a signal in the frame format shown in FIG. 2. The frame format shown in FIG. 2 is configured by BCCH 201, FCCH (Frame Control CHannel) 202, SBCH (Slow Broadcast control CHannel) 203, DL (Down Link) 204, UL (Up Link) 205 and RA (Random Access channel) 206.

When a new communication network is set up, the NET-ID assignment method investigates NET-IDs of adjacent base stations, then decides an appropriate NET-ID based on the investigation result. At this time, the decided NET-ID is updated in the NET-ID table stored in the base station.

More specifically, when a new communication network is set up, the newly-set base station issues a communication request to the existing base station. This request is made by frame composition section 107 sending an investigation instruction signal via RA 206. This investigation instruction signal is automatically or manually sent when power is turned on when a new base station is set up.

The existing base station that receives the signal sent via this RA 206, that is, the base station having a service area overlapping with the newly-set base station broadcasts a base station number via BCCH 201. This newly-set base station receives a signal including this base station number, demodulates the signal by demodulation section 103 and recognizes the base station number.

Then, for the recognized base station number, the newly-set base station sends to frame composition section 107 frame assignment information instructing that a TDMA-based time slot to be assigned and frame composition section 107 composes this frame assignment information into FCCH 202 and sends the frame-composed signal to the existing base station.

Then, the existing base station notifies the content of the NET-ID table of the own station via BCCH 201. The newly-set base station receives this signal and sends the signal to network ID assignment section 105. Network ID assignment section 105 decides a NET-ID based on the content of the received NET-ID table so that no collision occurs between NET-IDs and updates the received NET-ID and decided NET-ID in network ID table 104.

The updated content of the network ID table is sent to the existing base station and the existing base station updates the received content of the network ID table in the network ID table of the own station.

Thus, NET-IDs can be assigned in such a way as not to collide with NET-IDs of other communication networks.

Here, it is also possible to manually investigate NET-IDs beforehand and assign an unused NET-ID based on the information. In this case, since an unused NET-ID is manually investigated, there is no need to provide a special mechanism to investigate NET-IDS, making it possible to simplify the apparatus.

Furthermore, it is also possible to manually assign (set) NET-IDs based on the investigation result of NET-IDS. In this case, there is no need to provide a special mechanism to set NET-IDs, making it possible to simplify the apparatus. In this case, it is also possible to automatically assign (set) NET-IDS, that is, for the base station to independently assign (set) NET-IDs or manually assign NET-IDs beforehand.

Furthermore, NET-IDS can also be investigated periodically for a certain period of time. This allows a NET-ID table to be updated periodically and allows unused NET-IDs to be assigned more effectively without any collision. There is no restriction on the investigation period.

Furthermore, NET-IDS, which the newly-set base station acquires from the existing base station, can be acquired from a wired communication network or from a wireless communication network. For example, in the case where at least two base stations share a communication network and these base stations are connected over a wired communication network, it is possible for the existing base station to directly send NET-IDs to the newly-set base station through a wired communication.

Figure 3:
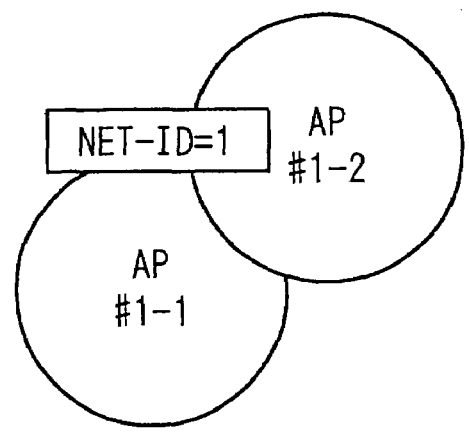
FIG. 3 is a drawing to explain a method of assigning NET-IDs to a communication network.

Next, the network identifier assignment method above will be explained with a specific example:

(1) Company A installs a communication network for an in-house LAN (see FIG. 3).

First, AP#1-1 is installed and set to NET-ID=1. At this time, since this system is not used around, it is possible to set an arbitrary value without limitation.

Next, AP#1-2 is installed and assigned a NET-ID. At this time, since AP#1-2 constructs a communication network in the same system, the same NET-ID (NET-ID=1) as that of AP#1-1 is used as the NET-ID. At this time, AP#1-2 acquires NET-ID=1 from AP#1-1 through a wired or wireless communication using the method above.

Figure 4:
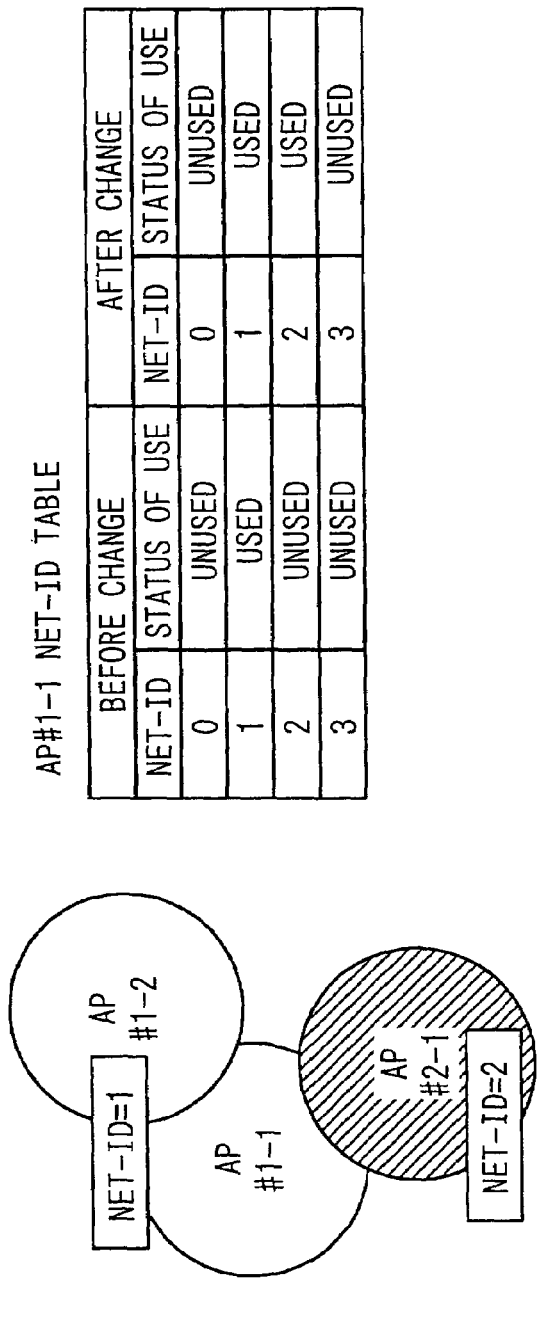
FIG. 4 is a drawing to explain a method of assigning NET-IDs to a communication network.

(2) Company B installs a communication network for an in-house LAN (see FIG. 4).

In (1), company B further installs AP#2-1 and sets NET-ID=2. At this time, AP#2-1 receives BCCH data from AP#1-1 and identifies the base station number and then requests AP#1-1 to send the content of the NET-ID table. In response to the request from AP#2-1, AP#1-1 sends the content of the NET-ID table of the own station to AP#2-1.

From this, AP#2-1 can recognize from the content of the received NET-ID table that NET-IDs other than NET-ID=1 are unused. Then, AP#2-1 sets a NET-ID other than NET-ID=1 as the NET-ID of the own station, for example, NET-ID=2 and at the same time updates the NET-ID of the own station set in the NET-ID table of the own station.

Furthermore, AP#2-1 sends the content of the updated NET-ID table to AP#1-1. AP#1-1 updates the content of the received NET-ID table in the NET-ID table of the own station and sends the content of the updated NET-ID table to AP#2-1 through a wired or wireless communication. AP#2-1 updates the content of the received NET-ID table in the NET-ID table of the own station.

(3) Company C installs a communication network for an in-house LAN (see FIG. 5).

In (2), company C installs AP#3-1 and sets NET-ID=3. At this time, AP#3-1 receives BCCH data from AP#2-1 and identifies the base station number and then requests AP#2-1 to send the content of the NET-ID table. In response to the request from AP#3-1, AP#2-1 sends the content of the NET-ID table of the own station to AP#3-1.

From this, AP#3-1 can recognize from the content of the received NET-ID table that NET-IDs other than NET-ID=1, 2 are unused. Then, AP#3-1 sets a NET-ID other than NET-ID=1, 2 as the NET-ID of the own station, for example, NET-ID=3 and at the same time updates the NET-ID of the own station set in the NET-ID table of the own station.

Furthermore, AP#3-1 sends the content of the updated NET-ID table to AP#2-1. AP#2-1 updates the content of the received NET-ID table in the NET-ID table of the own station and sends the content of the updated NET-ID table to AP#1-1 as BCCH data.

AP#1-1 updates the content of the received NET-ID table in the NET-ID table of the own station and sends the content of the updated NET-ID table to AP#1-2 through a wired or wireless communication. AP#1-2 updates the content of the received NET-ID table in the NET-ID table of the own station.

EMBODIMENT 2

This embodiment explains a case where the content of a NET-ID table is notified via a communication terminal such as a mobile station. For example, suppose a situation in which it is impossible to receive BCCH between base stations. In such a situation, there is a danger that a same NET-ID may be used. Thus, in the case where a communication terminal exists between both base stations, NET-IDs are assigned using this communication terminal.

Figure 7:
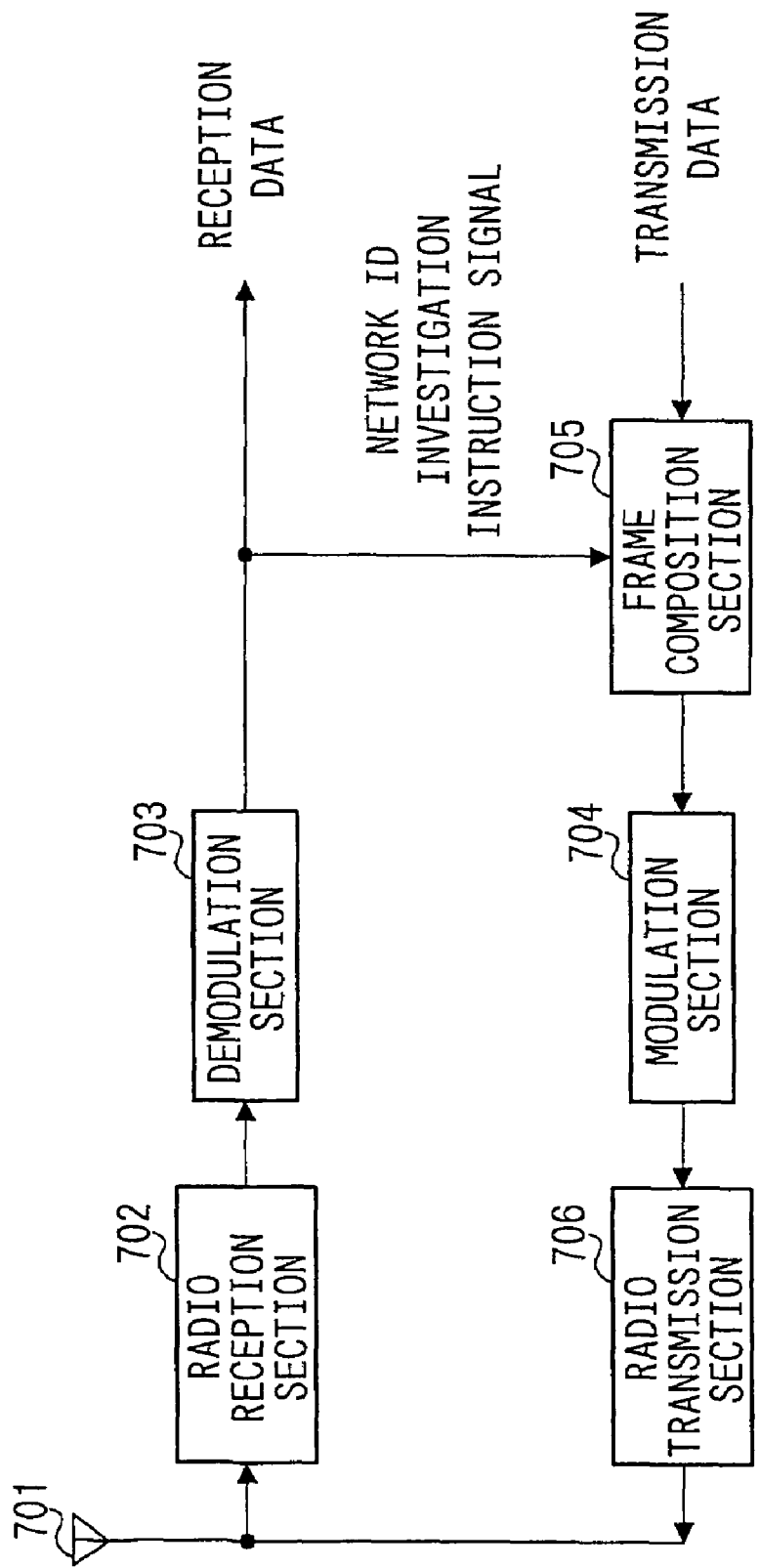
FIG. 7 is a block diagram showing an outlined configuration of a communication terminal apparatus that carries out a radio communication with a base station apparatus according to Embodiment 2 of the present invention.

The configuration of the base station apparatus according to Embodiment 2 of the present invention is the same as that of Embodiment 1 (FIG. 1). FIG. 7 is a block diagram showing a configuration of a communication terminal apparatus that performs a radio communication with the base station apparatus according to this embodiment.

A signal sent from the other end of communication is received by radio reception section 702 via antenna 701. Radio reception section 702 performs processing such as amplification (gain control), down-conversion, A/D conversion, etc. on the reception signal. After A/D conversion, this signal is sent to demodulation section 703 and demodulated, and output as reception data.

After being modulated by modulation section 704, the transmission data is sent to frame composition section 705, frame-composed there and sent to radio transmission section 706. Radio transmission section 706 performs processing such as D/A conversion, up-conversion, amplification (gain control) on the spread/modulated signal. The signal processed in this way is sent via antenna 701 as a transmission signal.

Then, operation of the base station apparatus with such a configuration, that is, the method of assigning NET-ID will be explained. Here, suppose a case where a newly-set base station and existing base station cannot receive BCCH, a communication terminal exists between both base stations and the communication terminal is sending a signal including the content of the NET-ID table to the base station at the other end of communication all the time or periodically.

Once a new communication network is set up, the newly-set base station can receive a signal including the content of the NET-ID table being transmitted/received between the communication terminal and existing base station. That is, the newly-set base station identifies the base station number, recognizes the BCCH time slot of the existing base station and receives the signal including the content of the NET-ID table through the same operation as that of Embodiment 1.

The newly-set base station extracts the content of the NET-ID table of the existing base station from the reception signal and sends the content to network ID assignment section 105. Network ID assignment section 105 decides a NET-ID based on the content of the received NET-ID table so that no collision occurs between NET-IDs and updates the received NET-ID and decided NET-ID in network ID table 104.

The updated content of the network ID table is sent to the existing base station via the communication terminal as shown above and the existing base station updates the received content of the network ID in the network ID table of the own station. The content of the NET-ID table updated by this newly-set base station is acquired by the existing base station from a signal sent all the time or periodically by another communication terminal that communicates with the newly-set base station and updated in the NET-ID table of the own station through the above-described procedure.

In this embodiment, when a new communication network is set up, it is also possible for the newly-set base station to request the existing base station to notify the content of the NET-ID table of the own station via the communication terminal that is communicating with the newly-set base station. At this time, upon reception of the request for the notification of the content, the communication terminal sends a network ID investigation instruction signal to frame composition section 705 and frame composition section 705 incorporates the network ID investigation instruction signal in the frame to be sent to the existing base station.

The communication terminal sends the signal including this network ID investigation instruction signal to the existing base station. The existing base station notifies the content of the NET-ID table of the own station to the communication terminal according to the network ID investigation instruction signal included in the reception signal.

The communication terminal sends the content of the NET-ID table of the existing base station to frame composition section 705 and frame composition section 705 incorporates the content of the NET-ID table of the existing base station in the frame to be sent to the newly-set base station. Then, the communication terminal sends the signal incorporating the content of the NET-ID table to the newly-set base station.

The newly-set base station extracts the content of the NET-ID table of the existing base station from the reception signal and sends the content to network ID assignment section 105. Network ID assignment section 105 decides a NET-ID based on the content of the received NET-ID table so that no collision occurs between NET-IDs and updates the received NET-ID and decided NET-ID in network ID table 104.

The updated content of the network ID table is sent to the existing base station via the communication terminal as shown above and the existing base station updates the content of the received network ID table in the network ID table of the own station.

In this way, this embodiment can also assign NET-IDs in such a way as not to collide with NET-IDs of other communication networks. Furthermore, this embodiment can efficiently assign NET-IDs even in the case where base stations have service areas overlapping with each other but it is impossible to receive BCCH between the base stations.

EMBODIMENT 3

This embodiment explains a case where extension codes are used when communication networks exceeding in number the number of NET-ID bits coexist.

In BCCH, there is a restriction on the number of bits assigned to a NET-ID (for example, 4 bits or less), and therefore SBCH is used when communication networks exceeding in number the number of bits assigned to the NET-ID in BCCH are set.

This SBCH is a channel used to investigate whether a target network is already contracted or a service to be used is supported or not, and is a broadcast channel, which is not transmitted for every frame but transmitted in a long cycle.

When this SBCH is used, it is necessary to use a specific NET-ID as an extension identifier. For example, suppose NET-ID=0 is an extension identifier.

In the case where the result of an investigation of an existing NET-ID before the installation of the base station shows that there is no unused NET-ID value, that is, the number of bits assigned to the NET-ID is 2, and all NET-ID=1 to 3 are used, information that the NET-ID is an extension identifier with the field of the NET-ID value regarded as "0" is broadcast.

Then, in the case where all NET-ID=1 to 3 are used, the NET-ID of the base station to be newly set is broadcast using SBCH. Therefore, in the case where the content of the NET-ID table is acquired and the extension identifier is all that is left, the extension identifier becomes a sign indicating that "the NET-ID will be broadcast by SBCH". This makes it possible to increase the number of NET-ID bits, and as a result, increase the number of installable communication networks. According to the method above, NET-IDs are investigated and set in the same way as for Embodiments 1 and 2 except that a different channel is used.

In this embodiment, it is also possible to distinguish a communication network using a NET-ID on BCCH from a communication network using a NET-ID on SBCH. For example, BCCH is used to broadcast only NET-IDs of a private communication network and SBCH is used to broadcast NET-IDs of a public communication network.

This makes it possible to simplify operation of devices used only for a private communication network. This means great merits in terms of cost and hardware scale. As a result, this embodiment is applicable to home appliances.

Furthermore, BCCH is used to broadcast only NET-IDs of a public communication network and SBCH is used to broadcast NET-IDs of a private communication network.

This makes it possible to fully secure the number of public communication networks that allow high-speed handover. For example, if a NET-ID has 4 bits, up to 15 types of public communication network with high-speed handover capability are acceptable. This number is considered enough when roaming among public communication network operators is taken into account.

In the case where communication networks exceeding in number the number of bits assigned to BCCH exist, this embodiment monitors NET-IDs used in adjacent communication networks even after the base station is set up. Then, in the case where the result of NET-ID monitoring shows that an extension identifier (for example, NET-ID=0) is used, actual NET-IDs are broadcast using extension identifiers via SBCH even in a communication network that has been using a NET-ID other than the extension identifier (for example, any one of NET-ID=1 to 3) so far.

That is, in the case where the number of already installed networks exceeds the number of bits assigned to BCCH, all communication networks broadcast NET-IDs using an extension identifier via SBCH.

A communication network (established earlier) that continues to use NET-ID=1 to 3 broadcasting via BCCH provides faster handover than a communication network (established later) broadcasting via long-cycle SBCH and this is not fair. As described above, it is possible to maintain fairness by all communication networks broadcasting NET-IDs using extension identifiers via SBCH.

Next, the network identifier assignment method above will be explained with a specific example.

Figure 6:
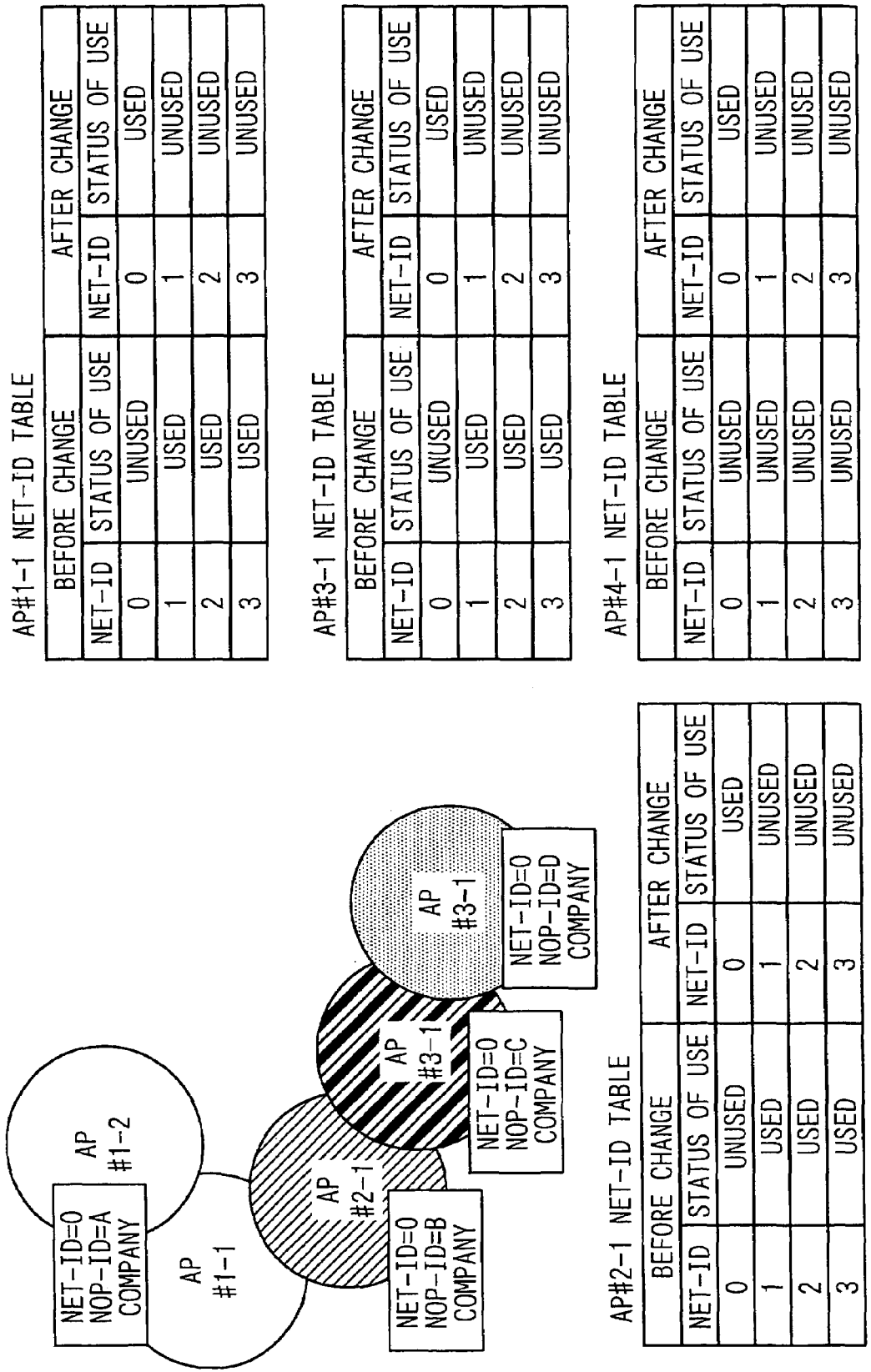
FIG. 6 is a drawing to explain a method of assigning NET-IDs to a communication network.

Company D installs a network for an in-house LAN (see FIG. 6).

In the case (3) explained in Embodiment 1, if company D installs AP#4-1 and sets a NET-ID, AP#4-1 receives BCCH data from AP#3-1 and identifies the base station number and then requests AP#3-1 to send the content of the NET-ID table. In response to the request from AP#4-1, AP#3-1 sends the content of the NET-ID table of the own station to AP#4-1.

From this, AP#4-1 can recognize from the content of the received NET-ID table that all NET-ID=1 to 3 are used and only NET-ID=0 is unused. Then, AP#4-1 sets an extension identifier NET-ID=0 as the NET-ID of the own station, and at the same time sets the identifier of the own company as an NOP-ID (Network Operator ID) in SBCH for communication network identification. Moreover, AP#4-1 updates the NET-ID of the own station set in the NET-ID table of the own station.

Furthermore, AP#4-1 sends the content of the updated NET-ID table to AP#3-1. AP#3-1 updates the content of the received NET-ID table in the NET-ID table of the own station. As a result of updating it is found that the NET-ID extension identifier is used, and therefore AP#3-1 sets NET-ID=0 (extension identifier) in the NET-ID table of the own station. Furthermore, AP#3-1 sets the identifier of the own company as an NOP-ID (Network Operator ID) in SBCH. AP#3-1 sends the content of the updated NET-ID table to AP#2-1.

AP#2-1 updates the content of the received NET-ID table in the NET-ID table of the own station. As a result of updating it is found that the NET-ID extension identifier is used, and therefore AP#2-1 sets NET-ID=0 (extension identifier) in the NET-ID table of the own station. Furthermore, AP#2-1 sets the identifier of the own company as an NOP-ID (Network Operator ID) in SBCH. AP#2-1 sends the content of the updated NET-ID table to AP#1-1.

AP#1-1 updates the content of the received NET-ID table in the NET-ID table of the own station. As a result of updating it is found that the NET-ID extension identifier is used, and therefore AP#1-1 sets NET-ID=0 (extension identifier) in the NET-ID table of the own station. Furthermore, AP#1-1 sets the identifier of the own company as an NOP-ID (Network Operator ID) in SBCH. AP#1-1 sends the content of the updated NET-ID table to AP#1-2 through a wired or wireless communication. AP#1-2 updates the content of the received NET-ID table in the NET-ID table of the own station. As a result of updating it is found that the NET-ID extension identifier is used, and therefore AP#1-2 sets NET-ID=0 (extension identifier) in the NET-ID table of the own station. Furthermore, AP#1-2 sets the identifier of the own company as an NOP-ID (Network Operator ID) in SBCH.

EMBODIMENT 4

This embodiment explains a case where by providing NET-IDs with an offset value, it is possible to more effectively prevent collision between NET-IDs and thereby support more communication networks. This allows the number of installable communication networks to be increased.

Figure 8:
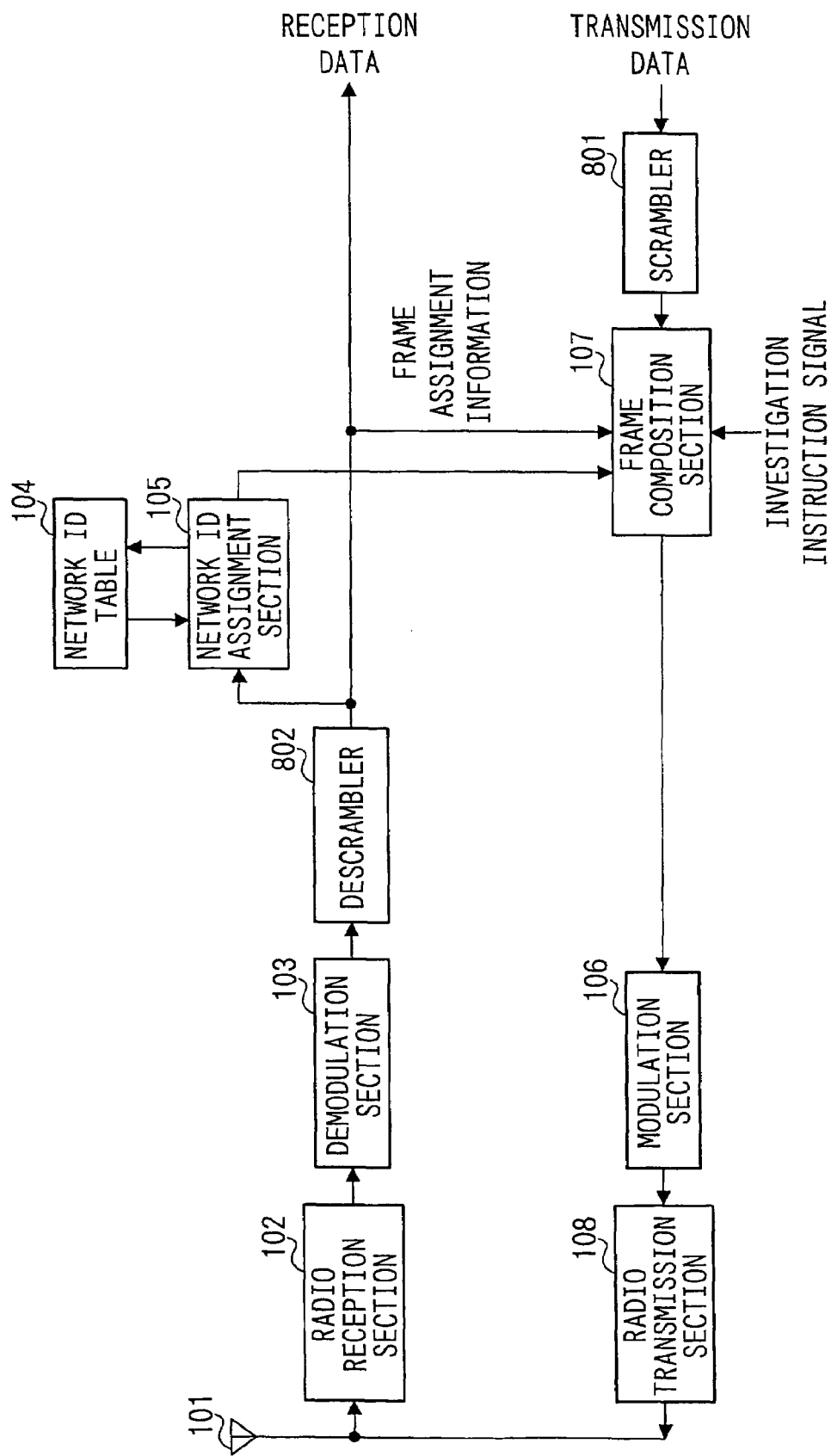
FIG. 8 is a block diagram showing an outlined configuration of a base station apparatus according to Embodiment 4 of the present invention.

FIG. 8 is a block diagram showing an outlined configuration of a base station apparatus according to embodiment 4 of the present invention. The same components as those in FIG. 1 will be assigned the same reference numerals and detailed explanations thereof will be omitted.

Figure 9:
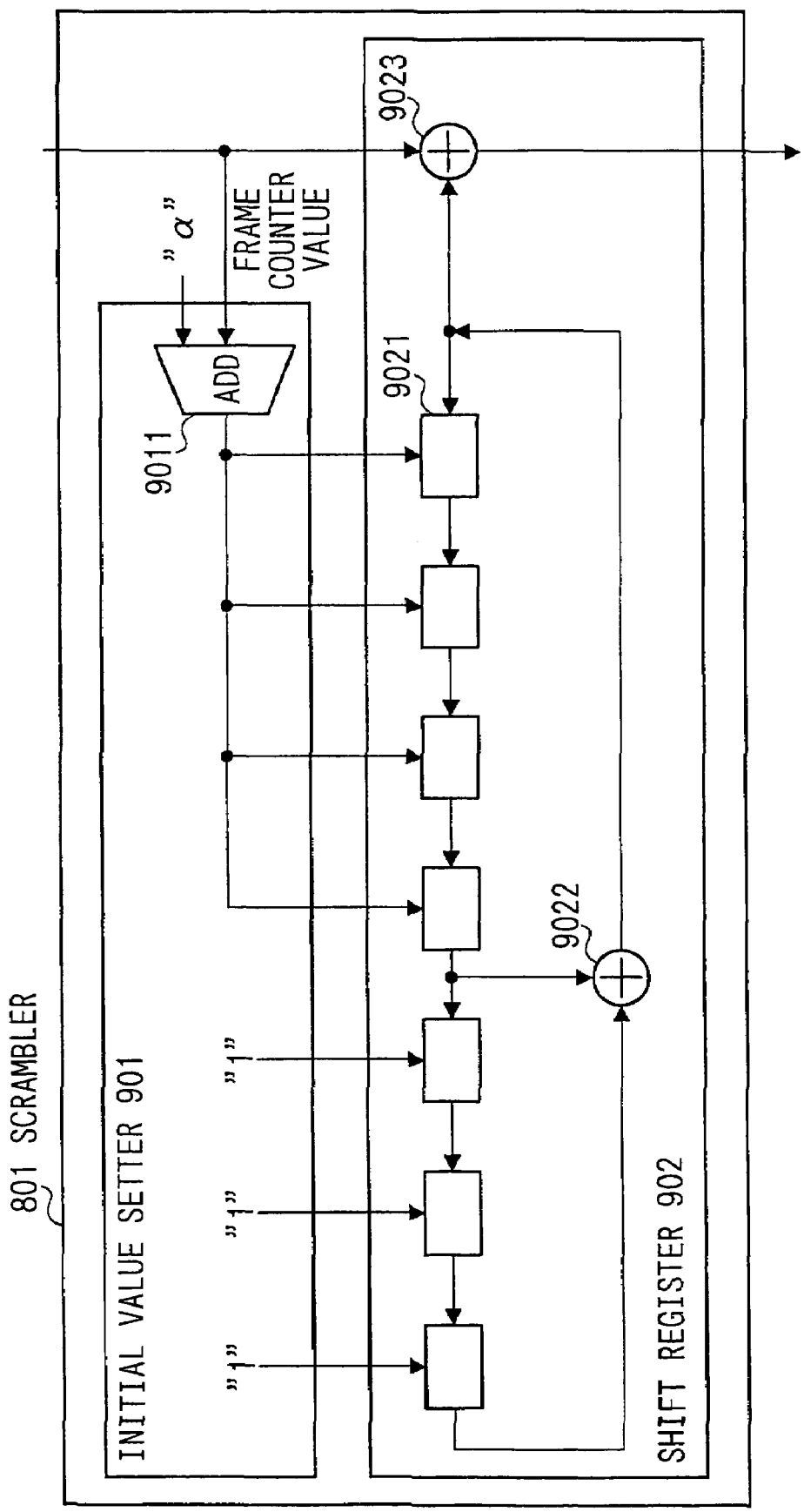
FIG. 9 is a block diagram showing a configuration of a scrambler in the base station apparatus according to Embodiment 4 above.

This base station apparatus is equipped with scrambler 801 that scrambles BCCH and descrambler 802 that descrambles scrambled BCCH. As shown in FIG. 9, scrambler 801 is configured by initial value setter 901 having adder 9011 that adds an offset value to a frame counter value and shift register 902 having delayer 9021 and adders 9022 and 9023. Descrambler 802 also has a configuration similar to that of the scrambler shown in FIG. 9.

This scrambler 801 uses a frame counter value (initial 4 bits of BCCH in FIG. 9)+α as the initial value. Therefore, when a frame counter value is input to adder 9011 of initial value setter 901 in the scrambler shown in FIG. 9, offset value α is added and output to shift register 902 (7 bits in FIG. 9).

With the presence of adder 9022, a bit string is randomized in this shift register 902. Thus, scrambling is performed by adding this randomized bit string to the frame counter value through adder 9023. In this way, predetermined bits (NET-ID bits) of BCCH are scrambled. Descrambling by descrambler 802 is also performed through an operation similar to that described above.

In this embodiment, MOD (frame counter value+α) can be used as a scrambler initial value. For example, in the case of 4 bits, MOD16 (α=0 to 15) is used. In this case, since there are 16 kinds of α and 16 kinds of NET-ID values, it is possible to identify communication networks of up to 256 types. Since α is assumed to have the same number of bits as that of the frame counter value in particular, there is no need to add special hardware for scrambling.

Furthermore, it is possible to extend the number of installable communication networks to 257 or more by setting (frame counter+β: β is an arbitrary numerical value equal to or greater than 16) as the initial value.

In this embodiment, it is also possible to enhance confidentiality of the system by changing the frame counter value, which becomes the initial value of the scrambler, from one frame to another. For example, scrambling processing is performed by changing a change pattern for every communication network and randomly selecting the frame counter value. More specifically, the frame counter value is incremented for every frame such as "1"→"2"→"3" in communication network 1, while the frame counter value is decremented for every frame such as "1"→"7"→"6" in communication network 2 and the frame counter value is incremented for every frame such as "1"→"3"→"5" in communication network 3.

Furthermore, the scrambler shown in FIG. 9 performs scrambling processing based on a polynomial of fixed length (sextic polynomial). It is possible to identify more communication networks by changing the degree of this polynomial from one system to another.

Considering a way to facilitate roaming and handover between different public service operators, it is desirable that the degree of a polynomial used for scrambling be identical among communication networks. Thus, a possible way is to change the degree of a polynomial between a private system and public system. For example, a sextic polynomial is used for a private system and a septic polynomial is used for a public system. In this way, it is possible to appropriately increase the number of identifiable communication networks for every system.

Embodiments 1 to 4 above describe the case where NET-IDs are used as network identifiers, but the present invention is also applicable to cases where any identifier is used as far as the identifier can identify a communication network. The embodiments above also describe the case where BCCH and SBCH are used as channels to broadcast NET-IDs, but the present invention can also use any channel as far as the channel can broadcast NET-IDs.

Embodiments 1 to 4 above describe the case where a NET-ID has 2 bits, but the present invention places no restrictions on the number of NET-ID bits. Furthermore, Embodiments 1 to 4 above describe the case where an extension code is set as NET-ID=0, but it is also possible to set the extension code for other NET-IDS.

Furthermore, Embodiments 1 to 4 above describe the case with a digital radio communication system according to a TDMA system, but the present invention is also applicable to other communication systems, for example, an OFDM system or CDMA system.

The present invention is not limited to Embodiments 1 to 4 above, but can be modified in various ways. For example, Embodiments 1 to 4 above can also be combined with each other as appropriate.

The base station apparatus of the present invention adopts a configuration including an investigating section that investigates network identifiers of existing base stations having overlapping communication network service areas and a network identifier assigning section that assigns an unused network identifier as the network identifier of the own station based on the result of the investigation above.

This configuration makes it possible to assign a network identifier so that the network identifier does not collide with network identifiers of other communication networks even when multiple communication networks coexist.

The base station apparatus of the present invention adopts a configuration including an investigating section that investigates network identifiers of existing base stations having overlapping communication network service areas, a setter that sets an extension identifier when the result of the investigation above shows that there is no unused network identifier and extends the number of bits assigned to the network identifier and a network identifier assigning section that assigns an unused network identifier as the network identifier of the own station.

This configuration makes it possible to assign a network identifier so that the network identifier does not collide with network identifiers of other communication networks even when multiple communication networks coexist. This configuration also makes it possible to extend the number of installable communication networks.

The base station apparatus of the present invention in the above configuration adopts a configuration including a table that correlates communication networks with network identifiers.

The base station apparatus of the present invention adopts a configuration with the investigating section above conducting investigation based on network identifier information sent from the existing base stations.

The base station apparatus of the present invention in the above configuration adopts a configuration including a scrambler that performs scrambling processing on network identifiers.

These configurations, by providing a network identifier with an offset value, make it possible to more effectively prevent collision among network identifiers, support more communication networks and increase the number of installable communication networks.

The communication terminal apparatus of the present invention adopts a configuration including a receiver that receives a signal including information that correlates communication networks with network identifiers and a transmitter that periodically transmits the information above to the other end of communication.

This configuration can assign network identifiers efficiently even when it is not possible to receive a control channel between base stations having overlapping service areas.

The network identifier assignment method of the present invention comprises a step of investigating network identifiers of existing base stations having overlapping communication network service areas and a step of assigning an unused network identifier based on the investigation result as the network identifier of the own station.

This method makes it possible to assign a NET-ID so that the NET-ID does not collide with NET-IDs of other communication networks when multiple communication networks coexist.

The network identifier assignment method of the present invention comprises a step of investigating network identifiers of existing base stations having overlapping communication network service areas, a step of setting an extension identifier when the result of the investigation above shows that there is no unused network identifier and extending the number of bits assigned to the network identifier and a step of assigning an unused network identifier as the network identifier of the own station.

This method makes it possible to assign a network identifier so that the network identifier does not collide with network identifiers of other communication networks even when multiple communication networks coexist. This method also makes it possible to extend the number of installable communication networks.

The network identifier assignment method of the present invention in the above method conducts investigation based on network identifier information sent from existing base stations.

The network identifier assignment method of the present invention in the above method includes a step of performing scrambling processing on network identifiers.

The base station apparatus and network identifier assignment method of the present invention described above investigate NET-IDs of adjacent base stations and assign a NET-ID of the own station based on the investigation result, and therefore can prevent NET-IDs from colliding with each other when multiple communication networks coexist.

This application is based on the Japanese Patent Application No. HEI 11-164468 filed on Jun. 10, 1999, entire content of which is expressly incorporated by reference herein.

INDUSTRIAL APPLICABILITY

The present invention is applicable to a communication terminal apparatus and base station apparatus in a digital radio communication system.

What is claimed is:

1. A base station apparatus forming a communication network that is identified by a unique network identifier, the base station apparatus comprising:

a table that stores states of use of a plurality of network identifiers;

a receiver that receives information about a state of use of a network identifier used by an existing base station apparatus;

an assigner that assigns a network identifier to said base station apparatus with reference to said information and updates the table in accordance with said information and said network identifier assigned to said base station apparatus;

a setter that sets an extending identifier and increases a number of bits for use for a network identifier, when there is no unused network identifier and said base station apparatus and said existing base station apparatus form different communication networks; and a transmitter that transmits information about the updated table, wherein:

when said base station apparatus and said existing base station apparatus form a same communication network, the assigner assigns the same network identifier as the network identifier used by said existing base station apparatus to said base station apparatus with reference to said information stored in the table, and when said base station apparatus and said existing base station apparatus form different communication networks, the assigner assigns a network identifier that is unused by said existing base station apparatus and different from the network identifier used by said existing base station apparatus to said base station apparatus and, if there is no unused network identifier, assigns the extending identifier and the increased number of bits as a network identifier to the communication network of said base station apparatus.

* * * * *